2,826,545

CYANOGEN CHLORIDE SOLUTIONS

George W. Walpert and Edwin K. Mahlo, Texas City, Tex., assignors to Monsanto Chemical Company, St. Louis, Mo., a corporation of Delaware No Drawing. Application January 3, 1956
Serial No. 556,829

2 Claims. (Cl. 252—1)

This invention relates to cyanogen chloride and, more specifically, to cyanogen chloride solutions. The invention also relates to the recovery of cyanogen chloride from a gas mixture containing the same by means of a selective solvent.

Cyanogen chloride is the starting material for the synthesis of cyanuric chloride which is an important intermediate in the manufacture of many products such as chemotherapeutic agents, insecticides, dyes, brightening agents, synthetic resins, plastics, rubber, and explosives. For use in polymerization to cyanuric chloride, however, the cyanogen chloride employed must be of a relatively high degree of purity. As produced industrially by the vapor phase reaction of hydrocyanic acid and chlorine, the gaseous cyanogen chloride product contains hydrogen chloride as the main impurity. Present methods for separation and recovery of the cyanogen chloride involve several complicated and time-consuming steps. It has now been determined that the gaseous cyanogen chloride product can be treated with a certain solvent which extracts the cyanogen chloride from the mixture thus providing a means for concentrating and/or separating the mixture as well as one for storing cyanogen chloride in the form of solutions in this solvent.

It is an object of the present invention to provide a solvent having exceptional utility in the aforementioned application. Other objects and advantages will become apparent from the following description of the invention.

It has now been discovered that kerosene is a good selective solvent for cyanogen chloride. The efficacy of this solvent for the purposes of the invention can be readily appreciated from a consideration of the following example which is presented to illustrate the invention, but is not intended in any way or manner to limit its scope.

Example

The gas bubbler apparatus employed for testing purposes consisted of a 750-ml. glass cylinder fitted with a gas inlet dip tube provided with medium-coarse glass frit on its lower end, a liquid inlet tube at the top and a drain tube at the bottom connected by a line in which there is located between the two a pump to provide for circulation of the solvent, a thermowell for recording temperatures, and a vent for unreacted gases connected to a gas sampling bottle. The gas bubbler was charged with 500 ml. of kerosene. Cold water was circulated through the jacket to maintain the temperature of the cylinder and its contents at about 20° C. After all lines had been thoroughly purged with nitrogen, pure cyanogen chloride and hydrogen chloride gases were fed at a rate of 3 cu. ft. per hour each through separate flow meters, calibrated with the respective gases, into a common line. The 1:1 mixture of the gases was then introduced into the gas inlet tube of the cylinder and bubbled through the kerosene. The kerosene solvent was recycled at a rate of about 1 cc. per second. Samples of the kerosene solvent were collected after gas had been bubbled through the solvent for a period of 20 minutes. These samples were analyzed for cyanogen chloride and hydrogen chloride content and found to contain 6.4% cyanogen chloride and only 0.11% hydrogen chloride.

It is obvious that not only is cyanogen chloride highly soluble in kerosene, but kerosene also exhibits the low solubility for hydrogen chloride which is desirable if any separation is to be effected between these two compounds by solvent extraction techniques.

According to the invention, this solvent is most efficiently used in the extraction of cyanogen chloride from gas mixtures thereof with hydrochloric acid such as are obtained from the reaction of hydrocyanic acid and chlorine, for example. The gas stream is treated with the aforementioned solvent in any convenient manner well known to those skilled in the art as, for example, by continuous countercurrent absorption under pressure in a suitable column. The solvent with its preferentially or selectively dissolved cyanogen chloride is then transferred to a suitable desorption column which is maintained under pressure and temperature conditions such as to release the dissolved cyanogen chloride from the solvent. The stripped solvent may be recycled to the extraction column to contact additional quantities of gas. The HCl component and any other components of the gaseous mixture which are not extracted by the solvent in the extraction column may be withdrawn therefrom and disposed of or treated in any desired manner.

In addition to the utility of this solvent in the recovery of cyanogen chloride for immediate process use, it is particularly suited for storing cyanogen chloride. In such instances, the liquid solvent saturated with cyanogen chloride may be charged into pressure cylinder from which the dissolved cyanogen chloride may subsequently be evolved at will by releasing the pressure. Any of the known inhibitors commonly employed for preventing the polymerization of cyanogen chloride such as tetrasodium pyrophosphate, for example, can be added to stabilize the solution.

The solvent described herein may be used per se or in mixtures with other cyanogen chloride solvents.

What is claimed is:

1. A composition of matter consisting essentially of a solution of cyanogen chloride in kerosene.

2. In a process for the concentration of cyanogen chloride from a gas containing the same together with hydrogen chloride, the step which comprises contacting said gas with kerosene.

No references cited.